(12) United States Patent
Weber et al.

(10) Patent No.: US 8,793,862 B2
(45) Date of Patent: Aug. 5, 2014

(54) WATER-TIGHT MEMBRANE

(75) Inventors: Ulrich K. Weber, Winterthur (CH); Magnus Kloster, Dietenheim (DE)

(73) Assignee: Sika Technology AG, Baar (CH)

( * ) Notice: Subject to any disclaimer, the term of this patent is extended or adjusted under 35 U.S.C. 154(b) by 240 days.

(21) Appl. No.: 13/084,921

(22) Filed: Apr. 12, 2011

(65) Prior Publication Data

US 2011/0197427 A1      Aug. 18, 2011

Related U.S. Application Data

(63) Continuation of application No. PCT/EP2009/063444, filed on Oct. 15, 2009.

(30) Foreign Application Priority Data

Oct. 15, 2008   (EP) ..................................... 08166677

(51) Int. Cl.
*B23P 25/00* (2006.01)
*B32B 9/04* (2006.01)

(52) U.S. Cl.
USPC ...................................... 29/527.2; 428/411.1

(58) Field of Classification Search
USPC ................. 29/460, 527.2, 428; 428/411, 447, 428/423.1, 500, 332, 195.1, 304.4, 411.1; 442/320, 327; 146/242
See application file for complete search history.

(56) References Cited

U.S. PATENT DOCUMENTS 3,481,810 A * 12/1969 Waite ............................ 156/242
4,065,924 A    1/1978 Young

FOREIGN PATENT DOCUMENTS

| GB | 2340 070 A | 2/2000 |
| JP | 1-145428 U | 10/1989 |
| JP | 2003118023 A | 4/2003 |

OTHER PUBLICATIONS

International Search Report (PCT/ISA/210) issued on Nov. 20, 2009, by European Patent Office as the International Searching Authority for International Application No. PCT/EP2009/063444.
Written Opinion (PCT/ISA/237) issued on Nov. 20, 2009, by European Patent Office as the International Searching Authority for International Application No. PCT/EP2009/063444.
English language translation of the Written Opinion (PCT/ISA/237) issued on Nov. 20, 2009, by European Patent Office for International Application No. PCT/EP2009/063444.
International Preliminary Report on Patentability (PCT/IB/373) issued on Apr. 19, 2011, by European Patent Office for International Application No. PCT/EP2009/063444.
Office Action ( Notice of Reasons for Rejection) dated Sep. 10, 2013, issued in the corresponding Japanese Patent Application No. 2011-531482, and an English Translation thereof. (7 pgs.).

* cited by examiner

*Primary Examiner* — John C Hong
(74) *Attorney, Agent, or Firm* — Buchanan Ingersoll & Rooney P.C.

(57) ABSTRACT

A sealant is arranged in a meshlike manner between a composite layer and a barrier layer in a water-tight membrane that includes a barrier layer and a composite layer. In the case of a leak in the barrier layer, the network of sealant between the composite layer and the barrier layer prevents the barrier layer from being affected. As a result, the size of the areas affected by penetrating water is limited. The damage by the penetrating water is thus limited to a smaller area, and the point of damage can thus be more easily localized.

26 Claims, 6 Drawing Sheets

WATER-TIGHT MEMBRANE

RELATED APPLICATIONS

This application claims priority as a continuation application under 35 U.S.C. §120 to PCT/EP 2009/063444, which was filed as an International Application on Oct. 15, 2009 designating the U.S., and which claims priority to European Application 08166677.8 filed in Europe on Oct. 15, 2008. The entire contents of these applications are hereby incorporated by reference in their entireties.

FIELD

The present disclosure relates to a water-tight membrane. More particularly, the present disclosure relates to a water-tight membrane that includes a barrier layer and a composite layer, which is arranged on one side of the barrier layer. The present disclosure also relates to a molded part that includes a water-tight membrane, a water-tight molded part, and to a method for sealing bases.

BACKGROUND INFORMATION

To seal bases against water penetration, water-tight membranes are known in the construction industry. For example, U.S. Pat. No. 4,065,924 describes a barrier layer that is connected to a composite layer, whereby the barrier layer is arranged on the base, and the composite layer ensures the bond with the poured concrete by its being permeated by the poured concrete.

The drawback of such seals is, however, that the barrier layer can become detached from the composite layer, and voids can form between them. In addition, the bond between the barrier layer and the composite layer cannot be caused completely by production, or the composite layer is not completely permeated with the poured concrete. This can all result in voids, which can propagate liquids. In the case of a leak in the barrier layer, caused for example by ingrowing roots, material fatigue or by tensile or shearing forces, penetrating water can affect the barrier layer by these interconnecting voids. As a result, on the one hand, large areas are affected by penetrating water, and, on the other hand, the exact localization of the leak is difficult.

SUMMARY

An exemplary embodiment of the present disclosure provides a water-tight membrane that includes a barrier layer, a composite layer arranged on one side of the barrier layer, and a sealant arranged intermittently between the composite layer and the barrier layer.

An exemplary embodiment of the present disclosure provides a method for sealing bases. The exemplary method includes installing a water-tight membrane, which has a barrier layer, a composite layer arranged on one side of the barrier layer and a sealant arranged intermittently between the composite layer, on a base, such that the barrier layer of the water-tight membrane is directed against the base. The exemplary method also includes applying liquid concrete on the composite layer of the water-tight membrane.

BRIEF DESCRIPTION OF THE DRAWINGS

Additional refinements, advantages and features of the present disclosure are described in more detail below with reference to exemplary embodiments illustrated in the drawings. The same elements are provided with the same reference numbers in the various drawings. The direction of flow of the media is indicated with arrows.

Only the elements that are essential for the immediate comprehension of the exemplary embodiments of the present disclosure are indicated.

DETAILED DESCRIPTION

Exemplary embodiments of the present disclosure provide an improved water-tight membrane in which the expansion of the voids along the barrier layer and thus the size of the areas affected by the penetrating water can be minimized.

For instance, exemplary embodiments of the present disclosure provide a water-tight membrane that includes a barrier layer and a composite layer, where a sealant is arranged intermittently between the composite layer and the barrier layer.

According to this arrangement, the sealant between the composite layer and the barrier layer impedes or prevents the barrier layer from being affected in the case of a leak in the barrier layer. For example, voids that are formed between the composite layer mixed with concrete and the barrier layer are interrupted by the sealant. As a result, the size of areas affected by penetrating water is limited. The damage by the penetrating water is thus limited to a smaller area, and the point of damage can thus be more easily localized. This is especially advantageous, for example, for eliminating the point of damage with a crack injection.

According to an exemplary embodiment, the sealant can be arranged in a meshlike manner. Such a meshlike arrangement is advantageous in that, as a result, a wide variety of mesh cells is provided, any individual one of which is surrounded by sealant. In the case of water penetrating, in the case of a leak in the barrier layer in such a mesh cell, the sealant along the mesh cell would impede the propagation outside of the mesh cell, whereby the connecting mesh cells further impede, in particular prevent, the propagation of the liquid.

It is also advantageous when the sealant partially penetrates the composite layer. As a result, voids in the composite layer through which liquids can propagate are interrupted by the sealant.

Figure 1:
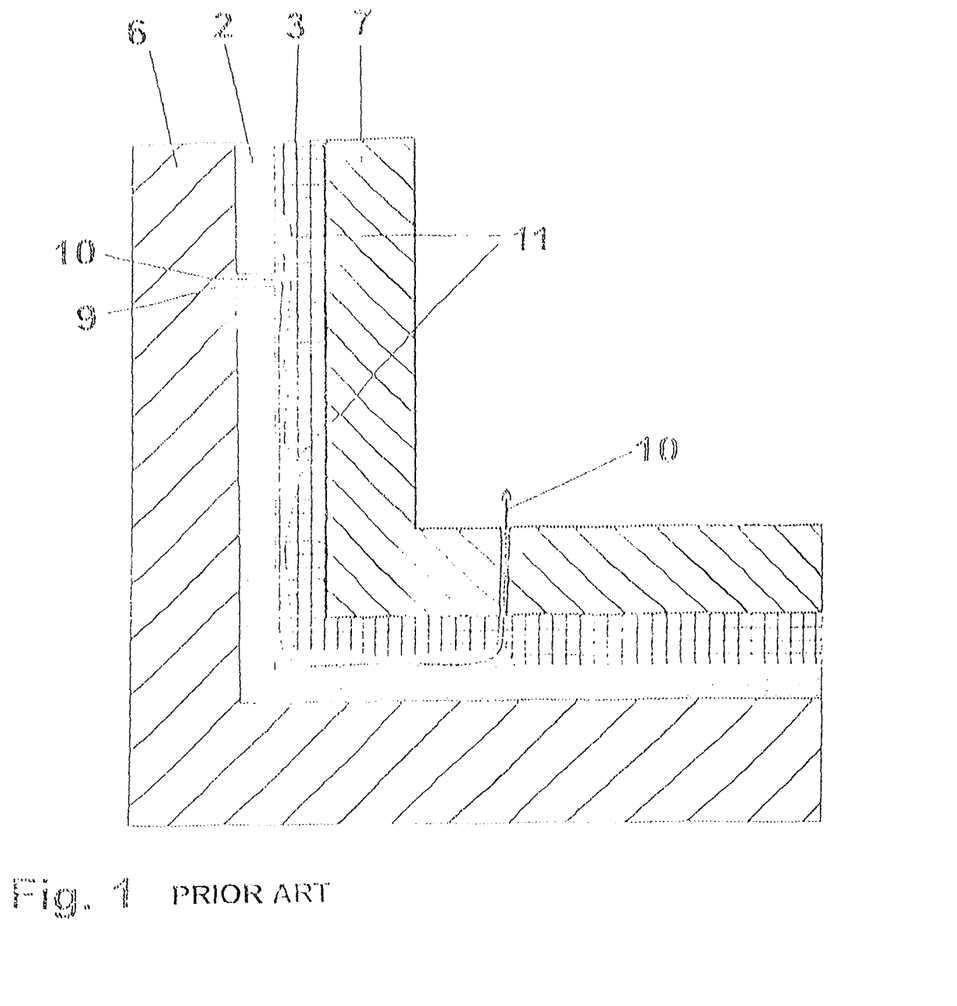
FIG. 1 shows a cross-section through a barrier layer that is connected to a composite layer according to a known technique.

FIG. 1 shows a cross-section through a barrier layer 2 that is connected to a composite layer 3 according to a known technique. The detachment of the composite layer 3 from the barrier layer 2 or an incomplete permeation of the composite layer 3 with concrete 7 can lead to voids 11 along the barrier layer 2. In the case of a leak 9, penetrating water 10 can affect the barrier layer 2 over large areas by interconnecting voids 11. If one of these voids 11 is connected to a crack in the concrete layer 7, the penetrating water 10 can penetrate the concrete 7 through this crack. In this case, the discharge point of the water 10 does not give any indications regarding the location of the leak 9.

FIGS. 2a to 2d show water-tight membranes 1 according to the disclosure. The exemplary water-tight membranes 1 include a barrier layer 2 and a composite layer 3, which is arranged on one side of the barrier layer 2, and a sealant 4 that is arranged intermittently between the composite layer 3 and the barrier layer 2.

As sealants 4, all materials are relevant that are suitable to reduce or to prevent the passage of liquids 10, such as water, for example, through the above-mentioned voids 11 along the barrier layer 2.

According to an exemplary embodiment, the sealant 4 can be made to be stable in the alkaline pH range, for example, produced by the concrete 7, and can experience its sealing function. According to an exemplary embodiment, the sealant 4 can also be made to have great resistance to possible additives of the penetrating liquid 10 in the case of a leak 9 in the barrier layer 2. Such additives can be, for example, salts, e.g., in the case of salt-water-containing ground water, calcium hydroxide, sulfur-containing compounds, as well as solvents.

According to an exemplary embodiment, the sealant 4 can be a thermoplastic or a thermoplastic elastomer. Thermoplastic elastomers have the advantage that the sealant has a good elasticity relative to horizontal and vertical shifts, such as shifts of the barrier layer 2 and the composite layer 3. A good elasticity of the sealant 4 prevents a cracking or detachment of the sealant 4 and thus a failure of the seal.

As used herein, plastics that combine the mechanical properties of vulcanized elastomers with the processibility of thermoplastics are defined as thermoplastic elastomers. For example, such thermoplastic elastomers can be block copolymers with hard and soft segments or so-called polymer alloys with corresponding thermoplastic and elastomer components.

According to an exemplary embodiment, thermoplastics and thermoplastic elastomers can be selected from the following group that consists of polyethylene (PE), low-density polyethylene (LDPE), ethylene/vinyl acetate copolymer (EVA), polybutene (PB); thermoplastic elastomers based on olefins (TPE-O, TPO) such as ethylene-propylene-diene/polypropylene copolymers; cross-linked thermoplastic elastomers based on olefins (TPE-V, TPV); thermoplastic polyurethanes (TPE-U, TPU) such as TPU with aromatic hard segments and polyester soft segments (TPU-ARES), polyether soft segments (TPU-ARET), polyester and polyether soft segments (TPU-AREE) or polycarbonate soft segments (TPU-ARCE); thermoplastic copolyesters (TPE-E, TPC) such as TPC with polyester soft segments (TPC-ES), polyether soft segments (TPC-ET) or with polyester and polyether soft segments (TPC-EE); styrene block copolymers (TPE-S, TPS) such as styrene/butadiene block copolymers (TPS-SBS), styrene/isoprene block copolymers (TPS-SIS), styrene/ethylene-butylene/styrene block copolymers (TPS-SEBS), styrene/ethylene-propylene/styrene block copolymers (TPS-SEPS); and thermoplastic copolyamides (TPE-A, TPA).

According to an exemplary embodiment, the sealant 4 can be selected from the group that consists of acrylate compounds, polyurethane polymers, silane-terminated polymers and polyolefins.

According to an exemplary embodiment, acrylate compounds can be based on acrylic monomers, such as acrylic and methacrylic acid esters, for example.

As used herein, the term "polyurethane polymer" encompasses all polymers that are produced according to the so-called diisocyanate polyaddition method. This also includes those polymers that are almost or completely free of urethane groups. Examples of polyurethane polymers are polyether polyurethanes, polyester polyurethanes, polyether polyureas, polyureas, polyester polyureas, polyisocyanurates, and polycarbodiimides.

According to an exemplary embodiment, the sealant 4 can be a contact adhesive and/or a melt adhesive. This ensures a good bond and good adhesion of the sealant to the barrier layer 2, or to the composite layer 3, and thus prevents the detachment of the sealant 4 and thus a failure of the seal.

Contact adhesives and melt adhesives are generally known to one skilled in the art and are described in CD Römpp Chemie Lexikon, Version 1.0, Georg Thieme Verlag, Stuttgart.

According to an exemplary embodiment, the sealant 4 can contain swelling substances, which expand to a multiple of their volume upon contact with water, e.g., between 200-1000% of the original volume. In addition to the volume enlargement, certain swelling substances can also react chemically with water. Examples of such swelling substances are swelling substances that are based on polyurethane, e.g., silane-modified polymers, which cure by moisture to form an elastic product. Another example of a swelling substance is bentonite-butyl rubber.

According to an exemplary embodiment, the swelling substances contained in the sealant 4 can be swelling substances that react in a delayed manner with water owing to a coating, so that during the contact with wet concrete, for example, the swelling substances do not swell or swell only a little and remain capable of swelling for the case where liquid 10, e.g., water, runs behind the water-tight membrane 1. Because of the swelling of the swelling substances in the case the water-tight membrane 1 is affected, the sealant 4 can be pressed more strongly against the barrier layer 2 and/or the composite layer 8 that is mixed with concrete; in addition, voids 11 are reduced by the volume expansion of the swelling substance. Both contribute to reducing—and in particular preventing—the passage of water through the voids 11 along the barrier layer 2.

According to an exemplary embodiment, the sealant 4 can be arranged in a surface structure and/or like a mesh.

Figure 4:
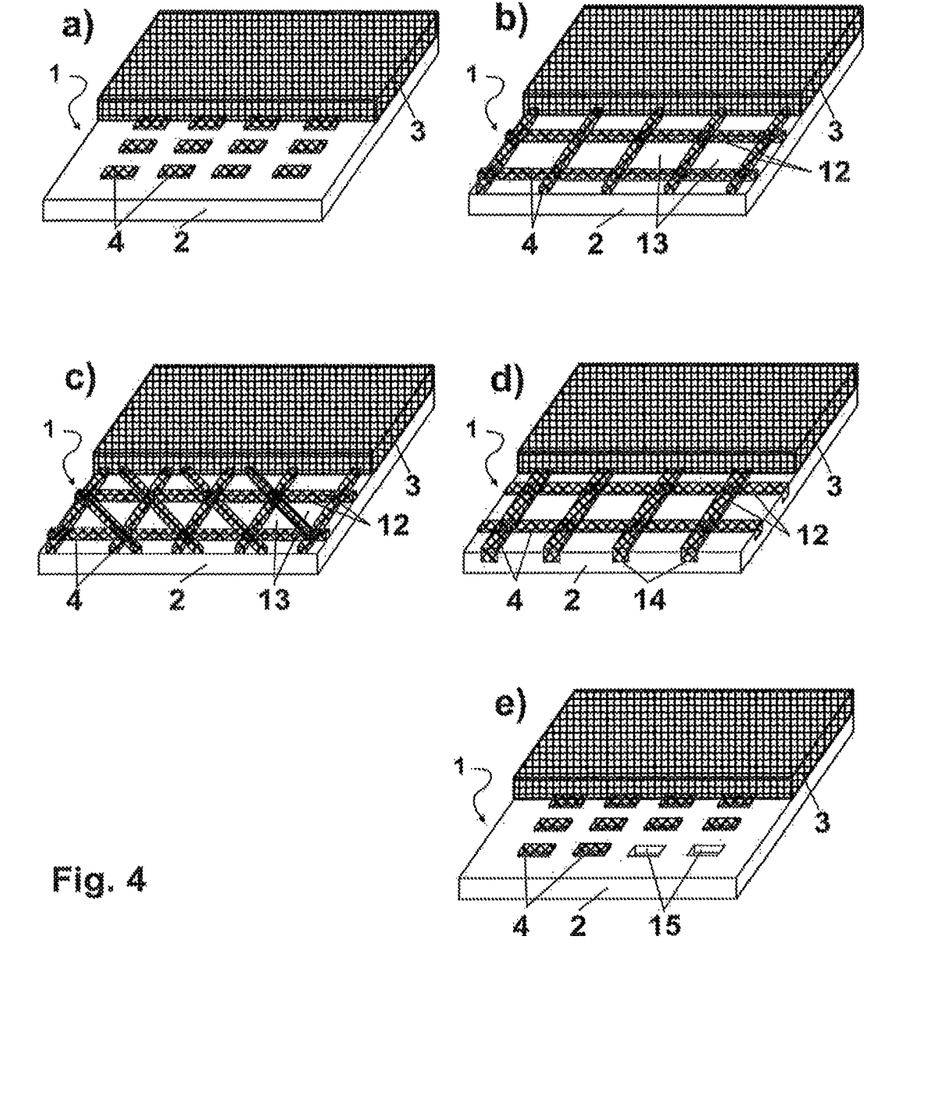
FIG. 4 shows perspective diagrammatic visualizations of arrangements of the sealant of the water-tight membrane according to an exemplary embodiment of the present disclosure.

Such a surface structure is depicted in, for example, FIGS. 4a and 4e, whereby in this connection, the term "surface structure" refers to the arrangement and design of the material in the space and not the surface composition of the material.

The individual surfaces can have any size and shape and may or may not be arranged uniformly. The advantage of an arrangement in a surface structure is, on the one hand, that the production is simpler, for example, when the individual surfaces are arranged uniformly and have the same shape and surface. On the other hand, because of a large surface area, a good bond and good adhesion of the sealant 4 on the barrier layer 2 or on the composite layer 3 are ensured, which in turn reduces the risk of the sealant 4 detaching and thus of the seal failing.

Figure 5:
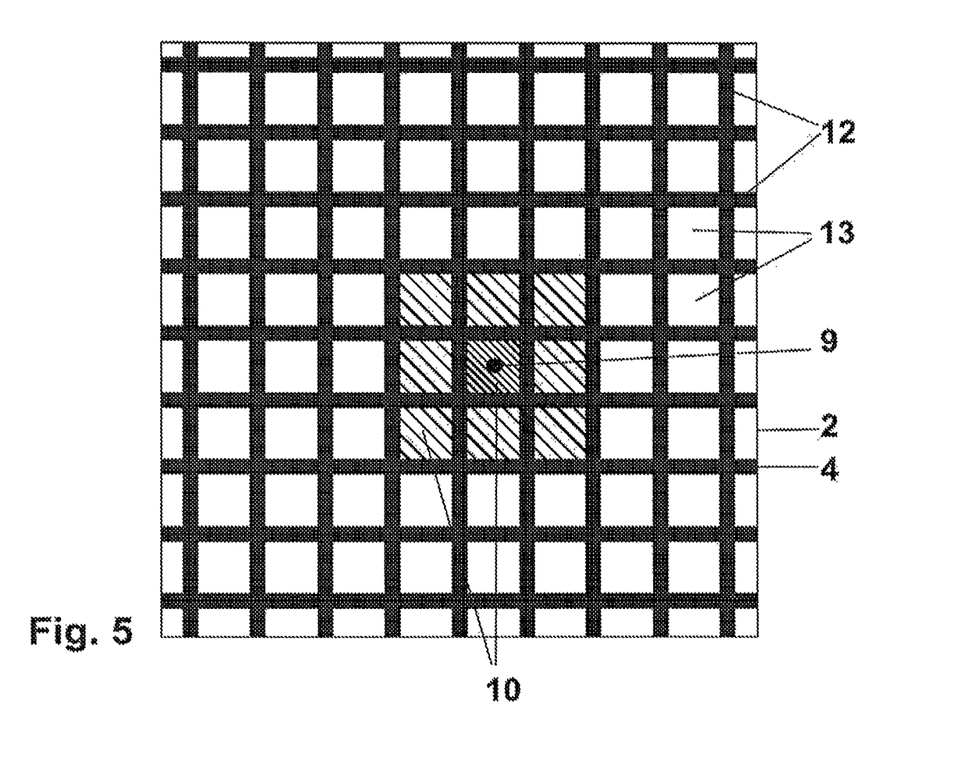
FIG. 5 shows perspective diagrammatic visualizations of the containment of the propagation of penetrating water by sealant that is arranged like a mesh in a water-tight membrane, according to an exemplary embodiment of the present disclosure.

A meshlike arrangement of the sealant 4, whereby the sealant forms the mesh lines 12, is shown in, for example, FIGS. 4b, 4c and 4d. The meshlike arrangement may or may not be structured. A meshlike arrangement, such as a structured meshlike arrangement, is advantageous in that, as a result, less sealant 4 is required compared to an arrangement in a surface structure. Another advantage is that by the meshlike arrangement, a wide variety of mesh cells 13 is provided, any individual one of which is surrounded by sealant 4. In the case of a liquid 10 penetrating such a mesh cell 13, the sealant 4 along the mesh cell 13 would impede and in particular prevent the propagation outside of the mesh cell, whereby the connecting mesh cells further impede, e.g., prevent, the propagation of the liquid 10. This is shown by way of example in FIG. 5, whereby the density of the section lining corresponds to the amount of penetrating liquid 10.

Figure 2:
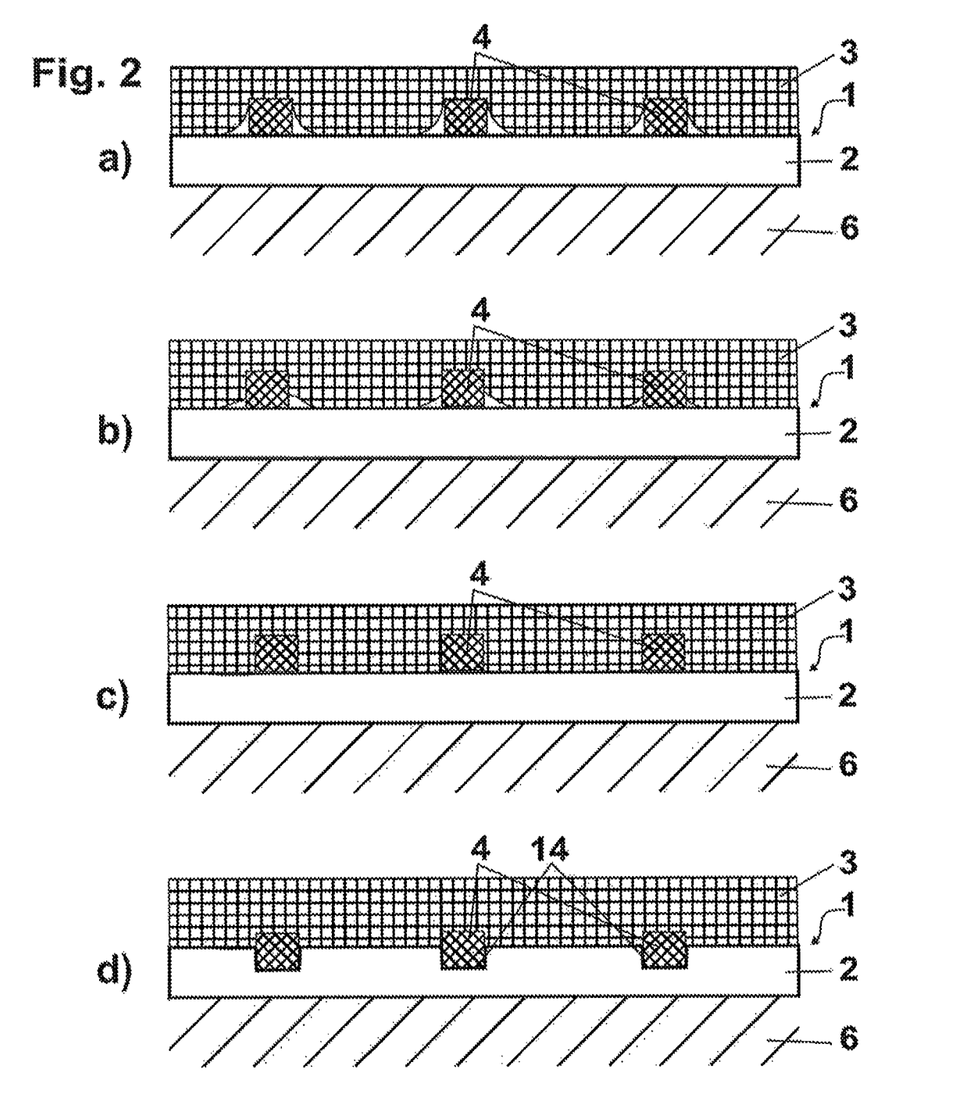
FIG. 2 shows cross-sections through water-tight membranes before liquid concrete is added to the composite layer, according to an exemplary embodiment of the present disclosure.
Figure 3:
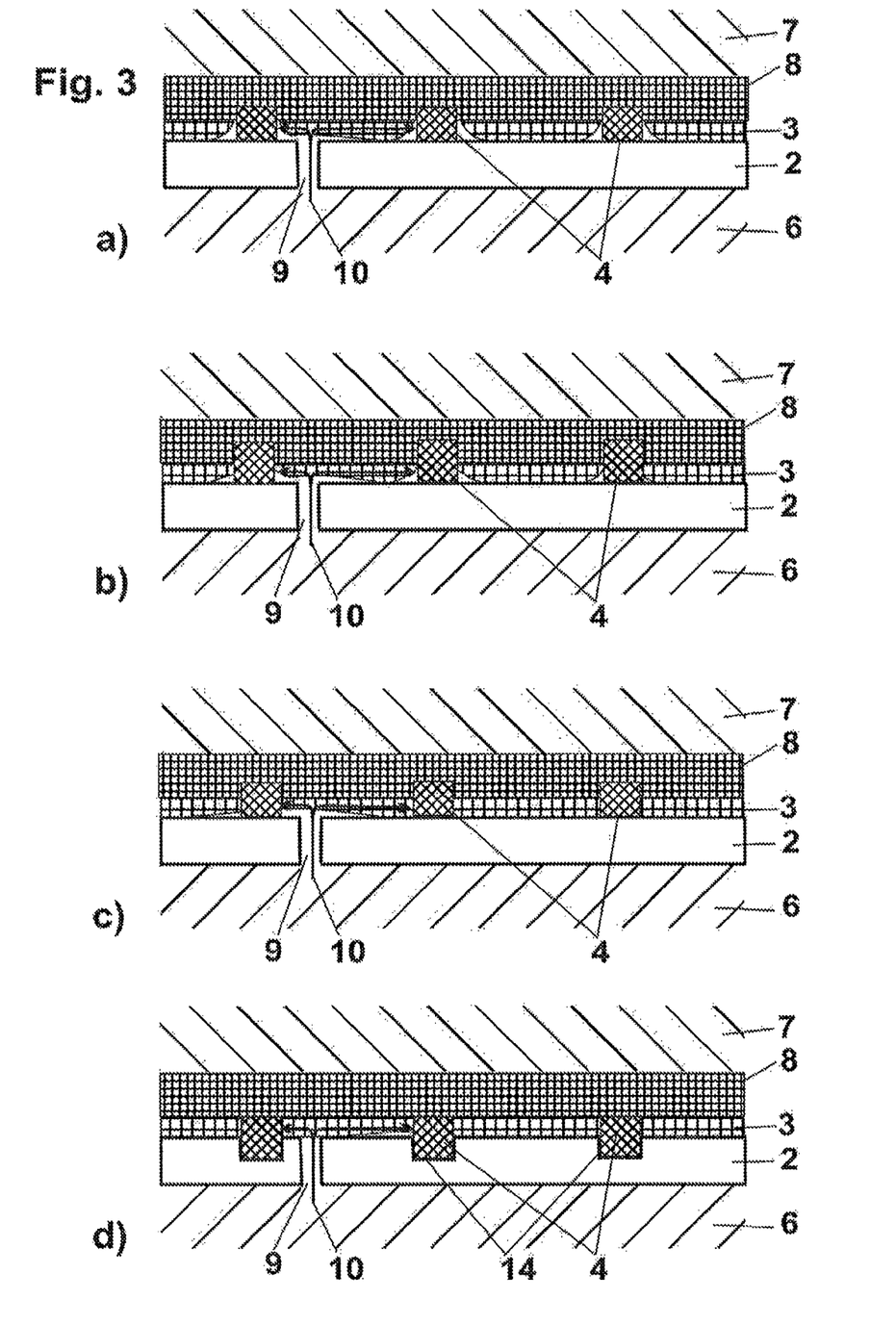
FIG. 3 shows cross-sections through water-tight membranes that are connected with concrete, according to an exemplary embodiment of the present disclosure. A sealant is provided to prevent the propagation of penetrating liquid into the void between a composite layer mixed with concrete and a barrier layer.

The sealant 4 can penetrate partially, as shown in FIG. 2b, or else completely, as shown in FIG. 2c, into the composite layer 3, for example, when the composite layer 3 is a porous material. The sealant 4 also cannot penetrate the composite layer 3 at all, as is shown in FIG. 2a.

In case the sealant 4 completely penetrates the composite layer 3, it may be advantageous that the composite layer 3 has a larger thickness than the sealant 4. As a result, the sealant 4 does not penetrate the thickness of the composite layer 3 completely, which can have the advantage that the sealant 4 does not reach the surface of the side of the composite layer 3 that faces away from the barrier layer 2. Such a sealant 4, for example when it is a permanently sticky sealant, can be disadvantageous during the rolling on and off of the water-tight membranes 1, during transport and in walking on the water-tight membrane before the application of concrete 7.

The sealant 4 can penetrate 4.0-80% of the thickness of the composite layer 3. According to an exemplary embodiment, the sealant 4 can penetrate 5-50%, e.g., 10-30% of the thickness of the composite layer 3.

This penetration arrangement is advantageous in that, as a result, a better bond and better adhesion of the sealant to the composite layer is produced. In addition, due to this arrangement, areas of the composite layer, e.g., near the barrier layer 2, which are slightly permeated with concrete 7 and are thus likely permeable to penetrating liquid 10, can be sealed.

Accordingly, the sealant 4 can have a stability that allows the penetration into the composite layer 3, but it penetrates the composite layer only partially, for example, less than 80% of the thickness of the composite layer. As used herein, the term "stability" is defined as the resistance of the sealant 4 to flow-off.

Parts of the composite layer 3 can be connected directly to the barrier layer 2, for example, where there is no sealant 4 between the composite layer and the barrier layer.

As used herein, "directly connected" is defined as no further layer or substance being present between two materials and the two materials being directly connected to one another or adhering to one another. At the transition between the two materials, the two materials can be present mixed in one another.

The composite layer 3 can essentially be arranged securely on the barrier layer 2. This can be carried out, for example, in that in production, the water-tight membrane 1, the composite layer 3 and the barrier layer 2 are directly connected to one another by heat treatment, by pressure, by physical absorption, or by any other physical application of a force. This, this has the advantage that no chemical bond of barrier layer and composite layer by means of adhesives is necessary, which has an advantageous effect on the production costs of the water-tight membrane 1. In particular, the composite layer and the barrier layer can be connected to one another by lamination. By lamination, a stronger bond between the composite layer, in particular when it is a non-woven material, and the barrier layer can be achieved. In addition, the bond quality in the production of water-tight membranes by lamination is subject to more reliable and fewer fluctuations in the production parameters than in the case of the bond by adhesives.

There is also the possibility, however, to connect the composite layer 3 and the barrier layer 2 to one another by adhesive.

In addition, according to an exemplary embodiment, the barrier layer 2 and/or the composite layer 3 can be made of a flexible plastic layer.

On the one hand, this has the advantage that the barrier layer 2, or the composite layer 3, thus has good elasticity relative to horizontal and vertical shifts. On the other hand, this allows an economical production and a good resistance to weathering, e.g., against low temperatures and moisture. In addition, flexible plastic layers, such as when the barrier layer 2 and the composite layer 3 are constituted thereof, allow the rolling-on of the water-tight membrane 1, which facilitates the transport and the installation of the water-tight membrane to the base 6.

The barrier layer 2 can be composed of any material(s) that ensure(s) an adequate sealing even at high liquid pressures.

It is thus advantageous when the barrier layer 2 has a high resistance against water pressure and shows good values in tear propagation tests and perforation tests, which is especially advantageous in the case of mechanical stress on construction sites.

According to an exemplary embodiment, the barrier layer 2 can be a thermoplastic layer, for example a polyethylene layer. This leads to a high capability of withstanding environmental influences.

According to an exemplary embodiment, the barrier layer 2 can be selected from one or more of the following materials: polyethylene with high density (HDPE), polyethylene with medium density (MDPE), polyethylene with low density (LDPE), polyethylene (PE), polyethylene terephthalate (PET), polystyrene (PS), polyvinyl chloride (PVC), polyamides (PA), ethylene vinyl acetate (EVA), chlorosulfonated polyethylene, thermoplastic polyolefins (TPO), ethylene-propylene-diene rubber (EPDM) and mixtures thereof.

The barrier layer 2 can have a thickness of 0.1-5 mm. According to an exemplary embodiment, the barrier layer 2 can have a thickness of 0.5-2.5 mm, e.g., 0.8-1.5 mm.

By surface treatments such as, for example, corona treatment, fluorination and flame impingement of the barrier layer 2, the adhesion of the composite layer 3 and the sealant 4, in particular the sealant, can be improved.

According to an exemplary embodiment, the barrier layer 2 can have a coating for increasing the radon sealing on the side that faces away from the composite layer 3. Such a coating can be a metal coating, for example, a coating that includes aluminum. It is also advantageous to put on the coating to increase the radon sealing in addition to a plastic layer to protect the coating from mechanical damage. For example, a barrier layer that is made of polyethylene with low density (LDPE) can have a coating that is made of aluminum on the side that faces away from the composite layer 3, whereby the coating in turn has an additional layer that consists of polyethylene with low density (LDPE) on the side that faces away from the barrier layer.

According to an exemplary embodiment, the barrier layer 2 can have an embossing 5, such as a gridlike embossing with grooves 14, for receiving the sealant 4, as is shown in, for example, FIGS. 2d and 4d. This arrangement has the advantage in that an improved bond and better adhesion of the sealant 4 with the barrier layer 2 result by an increase of the contact surface area between the barrier layer 2 and the sealant 4, which in turn reduces the risk of the sealant 4 detaching and thus of the seal failing.

In addition, the bond between the barrier layer 2 and the composite layer 3 can be improved in the areas near the sealant 4; for example, it can be made through-going.

A gridlike embossing 5 with grooves 14 allows a gridlike arrangement of the sealant 4 with the advantages as they were mentioned previously.

Also, embossing 5 with pockets 15 is possible, as is shown in FIG. 4e, and in production, the water-tight membrane 1—relative to a gridlike embossing with grooves 14—is connected into the pockets with the advantage of the simpler application of the sealant 4.

The embossing 5 can have a depth of 0.1-10 mm, e.g., 0.5-5 mm, and the distance between the grooves 14 or pockets 15 can be 0.5-30 mm, e.g., 1-10 mm.

The composite layer 3 can be composed of any material(s), such as those that are readily penetrated by liquid concrete 7 and that form a good bond with the hardened concrete 7.

As used herein, the term "composite layer" is defined as a layer that can ensure the bond with the poured concrete 7.

The composite layer 3 can thus participate in an essentially secure bond with concrete 7, when the concrete 7 is brought into contact with the composite layer 3 before its hardening.

According to an exemplary embodiment, the composite layer 3 can be composed of a porous material. A porous structure is conducive to the elasticity of the composite layer; it can thus tolerate better tensile and shearing forces. In contrast, it results in good uptake of liquid concrete and thus in a good bond with the liquid as well as the hardened concrete 7. This can be advantageous, for example, in the case of large surface tilt angles so that the concrete 7 does not slide on the composite layer 3.

According to an exemplary embodiment, the composite layer 3 can be composed of a fiber material. A used herein, a fiber material is defined as a material that is built up of fibers. The fibers include organic or synthetic material. In particular, these are cellulose, cotton fibers, protein fibers or synthetic fibers. As synthetic fibers, fibers that are composed of polyester or a homo- or copolymer of ethylene and/or propylene or rayon can be envisaged. In this connection, the fibers can be short fibers or long fibers, spun, woven or non-woven fibers or filaments. In addition, the fibers can be straightened or elongated fibers. In addition, it may be advantageous to use fibers that are different—both in geometry and in composition—with one another.

In addition, according to an exemplary embodiment, the fiber material can include intermediate spaces. These intermediate spaces can be built up by suitable production methods. The intermediate spaces can be at least partially open and allow the penetration of liquid concrete.

The element that is built up from fibers can be produced by the most varied methods known to one skilled in the art. For example, elements are used that are a cloth, fabric, or knit fabric.

The fiber material can be a loose material that is composed of spun fibers or filaments, whose cohesion in general is given by the adhesion that is specific to the fibers. In this regard, the individual fibers can have a preferred direction, or they can be undirected. The element that is built up from the fibers can be mechanically solidified by needling, meshing or by swirling by means of tight water jets.

A felt or non-woven material can be implemented as such a fiber material.

Such layers that are composed of fiber materials offer the same advantages as were previously mentioned for porous materials, and they have low production costs. In addition, as well as the porous materials, they have the advantage that they can be arranged essentially securely on the barrier layer 2 by heat treatment, by pressure, by physical adsorption or by any other physical application of a force, as was previously mentioned.

In addition, fiber materials can generally be produced very uniformly, by which a comparable penetration with concrete 7 can be achieved.

According to an exemplary embodiment, the composite layer 3 can protect the sealing material 4 and the barrier layer 2 from mechanical stress. For example, when the water-tight membrane 1 is laid and before and during the application of the liquid concrete, it can result in excessive mechanical stress, for example in walking on the water-tight membrane 1, by the laying of armoring iron or with the installation of liquid concrete 7. It is therefore advantageous when the composite layer 3 has a certain surface weight and thus has a certain pressure resistance against mechanical stress.

According to an exemplary embodiment, the composite layer 3 can be made of a thermoplastic material, and the material can selected from the following materials: polyethylene with high density (HDPE), polyethylene terephthalate (PET), polystyrene (PS), polypropylene (PP), polyvinyl chloride (PVC), polyamide (PA), and combinations thereof.

In addition, the composite layer 3 can have a thickness of 0.5-30 mm, e.g., 2-10 mm.

The water-tight membrane 1 can be produced in any manner. For example, the water-tight membranes 1 can be produced on commercially available machines. The water-tight membranes 1 can be produced in a single process step as a continuous product, for example by extrusion and/or calendering and/or lamination, and can be rolled up, for example, on rollers. The mass temperature in the extruder or calender can lie in a range of 100° C.-200° C., e.g., 120° C.-170° C., and/or 130° C.-150° C., for example, during the extrusion and/or the calendering and/or the lamination.

The sealant 4 can be poured through slotted nozzles onto the barrier layer 2, for example, shortly before the connection of the barrier layer with the composite layer 3. According to an exemplary embodiment, the sealant 4 can have a composition and a stability that are compatible with the temperatures of the production of the water-tight membrane 1.

According to an exemplary embodiment, the composite layer 3 can be connected to the barrier layer 2 by lamination, for example, shortly after the sealant 4 was applied to the barrier layer or at the same time.

According to an exemplary embodiment, the present disclosure also provides a molded part 16 that includes a water-tight membrane 1, as it was previously described, and a layer that includes an insulation material 17.

The insulation material 17, e.g., heat- and/or sound-insulating material, can be, for example, foamed polystyrene, foamed polyurethane, mineral wool or foam glass or combinations thereof.

The layer that is composed of insulation material 17 can have a thickness of 1-50 cm, for example.

Figure 6:
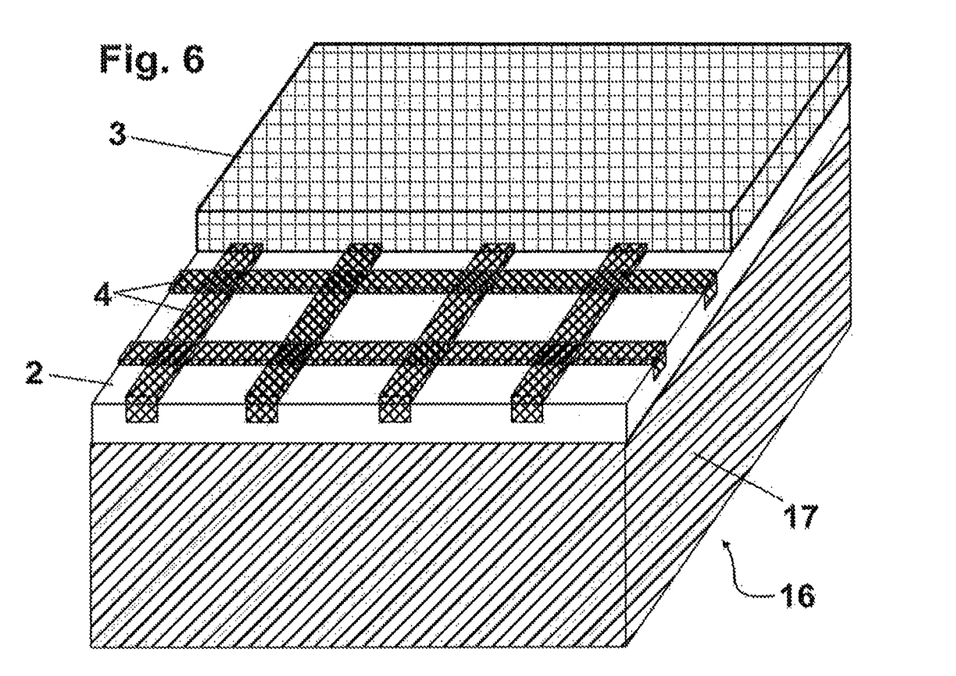
FIG. 6 shows a perspective diagrammatic visualization of a molded part that includes a water-tight membrane and a layer of insulating material, according to an exemplary embodiment of the present disclosure.

According to an exemplary embodiment, the molded part 16 can be a prefabricated part element, such as a plate, as is shown in FIG. 6, for example. Such a molded part is advantageous to the extent that insulation material 17 and water-tight membrane 1 can be applied in an operating step. Such molded parts are especially suitable for water-permeable insulation materials, whereby the barrier layer 2 prevents liquids from advancing.

In addition, an exemplary embodiment of the present disclosure includes a water-tight molded part 18 that includes a barrier layer 2, a composite layer 3, which is arranged on one side of the barrier layer 2, as well as a sealant 4, arranged intermittently between the composite layer and the barrier layer 2, whereby the barrier layer 2 is composed of a water-tight insulation material.

The water-tight insulation material corresponds to the above-described insulation material with the stipulation that the insulation material is water-impermeable. The layer that is composed of water-tight insulation material 19 can have a thickness of 1-50 cm, for example.

The composite layer 3 and the sealant 4 of the water-tight molded part 18 correspond to the composite layer and the sealant as they are mentioned for the water-tight membrane 1.

Figure 7:
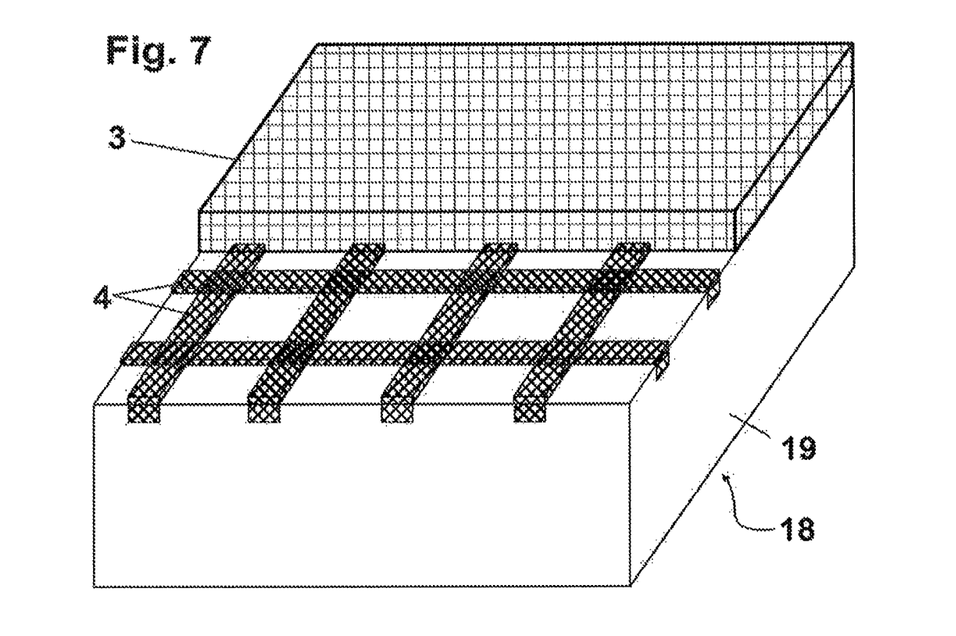
FIG. 7 shows a perspective diagrammatic visualization of a water-tight molded part, according to an exemplary embodiment of the present disclosure.

According to an exemplary embodiment, the molded part can be a prefabricated part element, e.g., a plate, as is shown in FIG. 7. The water-tight molded part 18 offers the same advantages as were previously mentioned for the molded part 16.

In addition, an exemplary embodiment of the present disclosure provides a method for sealing bases 6, including the steps:
 i) Application of a water-tight membrane 1 as previously mentioned on a base 6, whereby the barrier layer 2 of the water-tight membrane is directed against the base,
 ii) Application of liquid concrete 7 on the composite layer 3 of the water-tight membrane 1.

As used herein, liquid concrete is defined as concrete 7 before hardening. The concrete 7 can be part of a structure, e.g., a structure that is above or below ground level, such as, for example, a building, garage, tunnel, dump, watershed, embankment, or an element for the industrialized building.

The liquid concrete 7 can be poured in and/or on the composite layer 3 and can penetrate into the composite layer. It is especially advantageous when the liquid concrete 7 completely permeates the composite layer 3. After the concrete 7 hardens, an essentially secure bond between the hardened concrete 7 and the composite layer 3 can be formed and thus forms the water-tight membrane 1, for example, when the concrete 7 in its liquid state has completely permeated the composite layer 3.

It is also advantageous, however, when the liquid concrete 7 does not completely permeate the composite layer 3. After the concrete 7 hardens, a part of the composite layer 3 that faces the barrier layer 2 is formed, and the composite layer 3 is not permeated by concrete 7, which thus has a greater elasticity relative to horizontal and vertical shifts, such as shifts of the barrier layer 2 and composite layer 3, than the concrete-permeated part of the composite layer 8. The higher elasticity of the composite layer 3 that is not permeated by concrete 7 can counteract the cracking or detachment of the sealant 4 and/or the barrier layer 2. In addition, cracks in the concrete 7 can thus be better bridged over.

In this case, the base 6 may or may not be horizontal. In addition, it can be earth, a structure or a formwork. For example, the base can be a vertically-positioned formwork that is made of wood or steel beams. The base can also be insulation material.

According to an exemplary embodiment, the method can additionally contain a step of fastening the water-tight membrane 1 to the base 6. This step can take place after the water-tight membrane 1 is installed on the base 6, for example, by mechanical fastening and/or cementing.

In addition, the present disclosure provides for the use of a water-tight membrane 1 as was previously mentioned for sealing bases 6.

Of course, the present disclosure is not limited to the embodiments that are shown and described.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SYMBOL LIST

1 Water-Tight Membrane
2 Barrier Layer
3 Composite Layer
4 Sealant
5 Embossing
6 Base
7 Concrete
8 Composite Layer Mixed with Concrete
9 Leak
10 Liquid
11 Void
12 Mesh Line
13 Mesh Cell
14 Groove
15 Pocket
16 Molded Part
17 Layer Composed of Insulation Material
18 Water-Tight Molded Part
19 Layer Composed of Water-Tight Insulation Material

What is claimed is:

1. A water-tight membrane comprising:
 a barrier layer extending in a first direction between first and second ends of the barrier layer;
 a composite layer which is arranged on one side of the barrier layer, the composite layer having a first thickness extending between a first surface on which the composite layer is arranged on the one side of the barrier layer, and a second surface opposite to the first surface, the composite layer extending in the first direction; and
 a sealant arranged intermittently between the composite layer and the barrier layer, the sealant being arranged at a plurality of points between the first and second ends of the barrier layer and extending in a second direction perpendicular to the first direction, and the sealant having a second thickness less than the first thickness of the composite layer.

2. The water-tight membrane according to claim 1, wherein the sealant is a thermoplastic or a thermoplastic elastomer.

3. The water-tight membrane according to claim 2, wherein the sealant is selected from the group that consists of acrylate compounds, polyurethane polymers, silane-terminated polymers and polyolefins.

4. The water-tight membrane according to claim 3, wherein the sealant is at least one of a contact adhesive and a melt adhesive.

5. The water-tight membrane according to claim 2, wherein at least one of the barrier layer and the composite layer is a flexible plastic layer.

6. The water-tight membrane according to claim 1, wherein the sealant is selected from the group that consists of acrylate compounds, polyurethane polymers, silane-terminated polymers and polyolefins.

7. The water-tight membrane according to claim 1, wherein the sealant is at least one of a contact adhesive and a melt adhesive.

8. The water-tight membrane according to claim 1, wherein the sealant is arranged in at least one of a surface structure and a mesh-like structure.

9. The water-tight membrane according to claim 1, wherein the sealant penetrates 0-80% of the thickness of the composite layer.

10. The water-tight membrane according to claim 9, wherein the sealant penetrates 5-50% of the thickness of the composite layer.

11. The water-tight membrane according to claim 1, wherein parts of the composite layer are connected directly to the barrier layer.

12. The water-tight membrane according to claim 1, wherein at least one of the barrier layer and the composite layer is a flexible plastic layer.

13. The water-tight membrane according to claim 1, wherein the barrier layer is a thermoplastic layer.

14. The water-tight membrane according to claim 13, wherein the barrier layer is a polyethylene layer.

15. The water-tight membrane according to claim 1, wherein the barrier layer has a thickness of 0.1-5 mm.

16. The water-tight membrane according to claim 15, wherein the barrier layer has a thickness of 0.5-2.5 mm.

17. The water-tight membrane according to claim 1, wherein the barrier layer has an embossing.

18. The water-tight membrane according to claim 17, wherein the embossing of the barrier layer is a gridlike embossing for receiving the sealant.

19. The water-tight membrane according to claim 1, wherein the composite layer is composed of a porous material.

20. The water-tight membrane according to claim 1, wherein the composite layer is a fiber material composed of one felt and a non-woven material.

21. The water-tight membrane according to claim 20, wherein the composite layer is at least one of a felt material and a non-woven material.

22. A molded part comprising:
a water-tight membrane according to claim 1; and
a layer composed of insulation material.

23. A water-tight molded part comprising:
a barrier layer;
a composite layer which is arranged on one side of the barrier layer; and
a sealant which is intermittently arranged between the composite layer and the barrier layer according to claim 1,
wherein the barrier layer is composed of a water-tight insulation material.

24. The water-tight membrane according to claim 1, wherein the sealant penetrates 10-30% of the thickness of the composite layer.

25. The water-tight membrane according to claim 1, wherein the barrier layer has a thickness of 0.8-1.5 mm.

26. A method for sealing bases, the method comprising:
installing a water-tight membrane, the water tight membrane including
a barrier layer extending in a first direction between first and second ends of the barrier layer,
a composite layer arranged on one side of the barrier layer, the composite layer having a first thickness extending between a first surface on which the composite layer is arranged on the one side of the barrier layer, and a second surface opposite to the first surface, the composite layer extending in the first direction, and
a sealant arranged intermittently between the composite layer, on a base, such that the barrier layer of the water-tight membrane is directed against the base, the sealant being arranged at a plurality of points between the first and second ends of the barrier layer and extending in a second direction perpendicular to the first direction, and the sealant having a second thickness less than the first thickness of the composite layer; and
applying liquid concrete on the composite layer of the water-tight membrane.

* * * * *